United States Patent [19]
Marek

[11] 3,921,086

[45] Nov. 18, 1975

[54] DEMODULATOR CIRCUIT FOR AMPLITUDE-MODULATED SIGNALS INCLUDING DIODES WITH LIKE POLES INTERCONNECTED AND A CURRENT SOURCE BIASING THE DIODES IN THEIR FORWARD CONDUCTING DIRECTION

[75] Inventor: Alois Marek, Nussbaumen, Switzerland

[73] Assignee: BBC Brown Boveri & Company Limited, Baden, Switzerland

[22] Filed: Dec. 18, 1973

[21] Appl. No.: 425,840

[30] Foreign Application Priority Data

Dec. 21, 1972 Switzerland ........................ 18589/72

[52] U.S. Cl. ............. 329/204; 307/235 R; 307/237; 329/146

[51] Int. Cl.[2] ............................................ H03D 1/10

[58] Field of Search ........... 329/204, 163, 164, 162, 329/165, 166, 146; 307/235 R, 235 A, 237

[56] References Cited

UNITED STATES PATENTS

| | | | |
|---|---|---|---|
| 2,647,207 | 7/1953 | Hawkins et al. | 329/163 X |
| 2,972,677 | 2/1961 | Meadows | 329/204 X |
| 3,083,330 | 3/1963 | Roth et al. | 307/235 R X |
| 3,351,863 | 11/1967 | Riemens | 307/237 X |
| 3,411,017 | 11/1968 | Hoffman | 307/235 R |
| 3,427,607 | 2/1969 | Oesterle | 307/235 R X |

*Primary Examiner*—Alfred L. Brody
*Attorney, Agent, or Firm*—Pierce, Scheffler & Parker

[57] ABSTRACT

A demodulation circuit for amplitude-modulated electrical signals includes at least two diodes having like poles interconnected with each other, the diodes being biased in their forward conducting direction such that the sum of the diode currents remains constant. The other poles of the diodes are connected to an input signal source of low impedance through a center tapped transformer winding or a choke coil.

11 Claims, 6 Drawing Figures

DEMODULATOR CIRCUIT FOR AMPLITUDE-MODULATED SIGNALS INCLUDING DIODES WITH LIKE POLES INTERCONNECTED AND A CURRENT SOURCE BIASING THE DIODES IN THEIR FORWARD CONDUCTING DIRECTION

The present invention relates to an improvement in a demodulation circuit for amplitude-modulated electrical signals, hereinafter referred to as AM-demodulators.

All receivers of high frequency signals contain a unit which draws from the high-frequency input signal a "low-frequency" potential, its time characteristic corresponding substantially to the time characteristic of the modulating voltage. The basic principles of such demodulators are well known and are described, for example, in "Taschenbuch der Hochfrequenztechnik" by Meinke/Gundlach, 3rd Ed. 1968, pp 1080 and following.

Standard AM-demodulators have the following deficiencies:

a. The functional relation between the demodulator output voltage and the input voltage injected into it is determined to a great extent by the individual characteristics of the components.

b. The impedance of the demodulator output is functionally related at least to the HF-signal amplitude, which can cause difficulties, for example, in the case of feed-back networks.

c. In the case of great modulation depth and/or high modulation frequency, there will occur great non-linear distortions, i.e. the time characteristic of the demodulator-output voltage will no longer conform with the time characteristic of the modulated voltage.

It has been proposed to improve on the quality of AM-demodulators by supplying the diode component of the demodulator circuit with an auxiliary current which will bias the diode in its forward, i.e. its conducting direction, with the expectation to go beyond the quadratic range of the current-voltage-characteristic of the demodulation. In this connection, reference is made to "General-Electric Transistor Manual", 7th Ed. Page 289 and especially FIG. 12.12. This measure does improve on the efficiency to a certain extent because the internal resistance of the diode can be adjusted to the particular resistors being utilized, but the desired linearity is not accomplished, and thus this known demodulation circuit still suffers from the above-discussed disadvantages.

The general objective of the present invention is to provide an improved demodulation circuit arrangement for amplitude-modulated electrical signals which avoids the disadvantages of known circuit arrangements, and which is also distinguished by a simple construction, a high linearity factor, and ease of parameter reproduction.

This objective is attained in accordance with the invention in that there are provided at least two diodes having like poles interconnected with each other, that the diodes are biased in the forward direction in such manner that the sum of the diode currents will remain constant, and that the other poles of the diodes are connected to an input signal source which is characterized by a low impedance which is low in relation to the differential resistance of one of the diodes at the forward biasing current provided by its source.

Various embodiments of the invention will now be described in conjunction with the accompanying drawings, wherein.

Figures 1, 2:
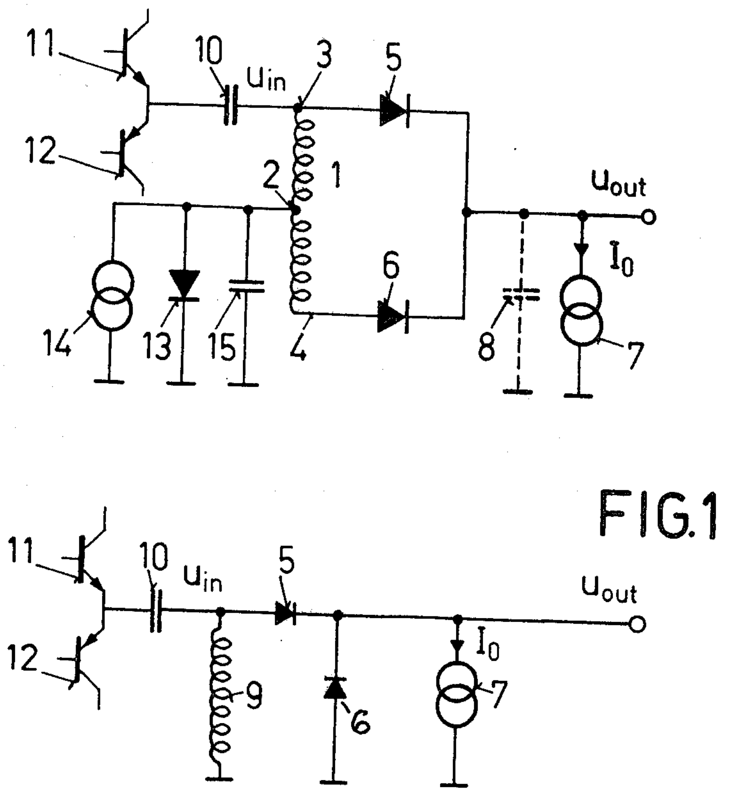
FIG. 1 is a circuit diagram illustrating one embodiment of the improved AM-demodulator utilizing a push-pull i.e. a two-way mode of operation.
FIG. 2 shows a different embodiment utilizing a one-way mode of operation.
Figure 5:
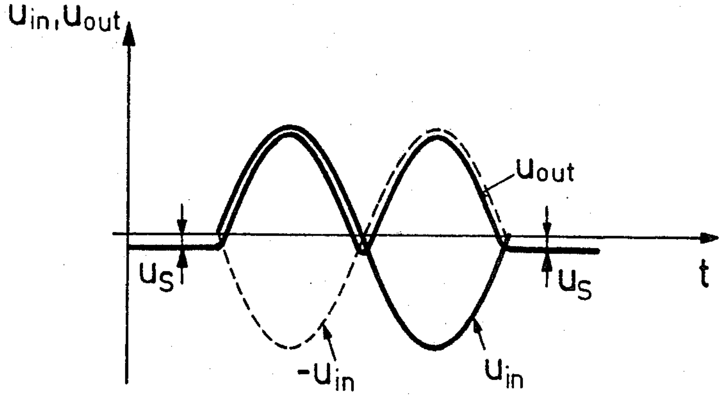
FIG. 5 is a graph with curve plots of the demodulator input and output signals to show their respective configurations.
Figure 6:
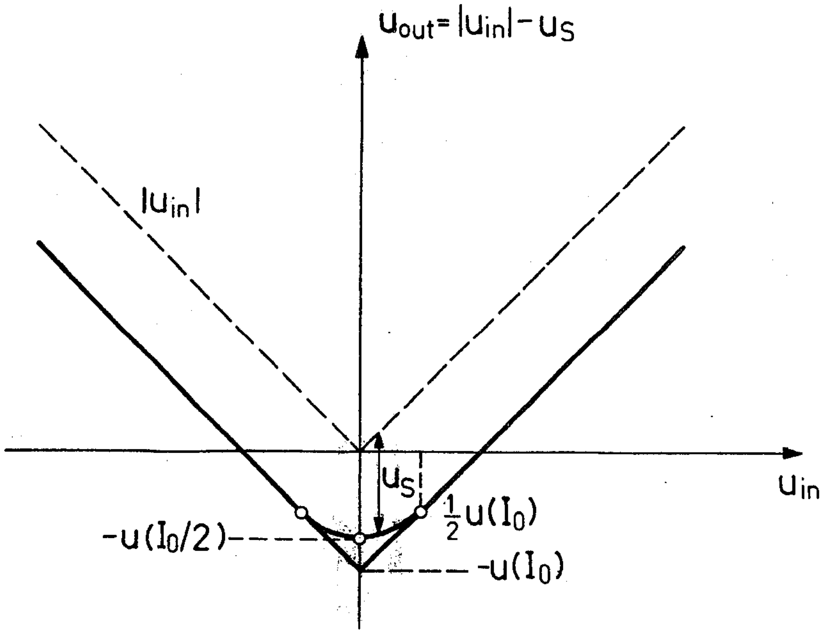
FIG. 6 is also a graph which illustrates the demodulator characteristics for low input signals.

With reference now to the embodiment of the AM-demodulator circuit depicted in FIG. 1 and in conjunction with the curve plots of FIGS. 5 and 6, it is seen that the demodulator contains a push-pull, i.e. a two-way drive constituted by a transformer 1 having a center tap 2, as the input signal source, the tap 2 being connected indirectly to ground potential, and the input signal $U_{in}$ being fed to one end 3 of the transformer winding by way of a capacitor 10 which is connected to the emitters of a complementary pair of emitter-follower transistors 11 and 12 which represents a low-impedance source for the input signal $U_{in}$. One diode 5 is connected to the transformer winding end 3 and a second diode 6 is connected to the opposite end 4 of the transformer winding. Like poles of the diodes 5 and 6 i.e. their anodes connect with the transformer winding ends so that they both are connected in the same forward flow direction, and the cathodes of the two diodes are interconnected with each other and the output terminal; voltage $U_{out}$ is also tapped from this interconnection.

A current source 7 is placed across the output and ground. Parallel to the current source 7 there is shown, in broken lines, a capacity 8 which symbolizes the stray capacitance of the output and which is maintained as small as is technically feasible.

If the current $I_o$ generated by source 7, is selected according to the relation:

$$I_o > C_{leak} \cdot \max \left| \frac{d(u_{in})}{dt} \right|,$$

wherein;

$C_{leak}$ represents the stray capacitance of condenser 8, and $u_{in}$ the instantaneous value of the input voltage $U_{in}$ the instantaneous value $u_{out}$ of the demodulator output voltage $U_{out}$ will then follow the absolute value of the demodulator input voltage with only a slight, almost constant voltage shift $u_s$, as is clearly seen from FIG. 5, in accordance with the relation:

$$u_{out} = |u_{in}| - u_s.$$

Disregarding the capacitance currents as well as the reverse currents of diodes 5 and 6, and assuming that the two diodes possess identical characteristics, $u_s$ will then range between the following limits:

$$u(I_o/2) \leq u_s \leq u(I_o),$$

wherein:

$u(I_o/2)$ and $u(I_o)$ represent the voltage values associated with the current values $I_o/2$ and $I_o$ of the U/I characteristics of diodes 5 and 6. When $u_{in} = 0$, then:

$$u_s = u(I_o/2)$$

and when $|u_{in}| \geq u(I_o)/2$, then:

$$u_s = u(I_o)$$

In practice, this has the following result: the diodes of the demodulator need to be selected only in the case of two current values, e.g. $I_o$ and $I_o/2$, thus making possible demodulator characteristics which can be reproduced and even be predetermined. The characteristic of an AM-demodulator, illustrated by FIG. 6 shows the fundamental relation between the instantaneous value $u_{in}$ of the input voltage and the instantaneous value $u_{out}$ of the output voltage. The transmission characteristic in its entirety can be approximated in a very effective and simple manner by plotting the effective value of the input voltage to the abscissa as a logarithmic base, and the logarithm of output voltage as the ordinate. The approximation of the characteristic is then represented as two straight half-lines which intersect at approximately 125 $mV_{eff}$ input voltage. The first part has the gradient +2 (quadratic range), and the second part the gradient +1 (linear range). The measured characteristic is almost identical with the first straight half-line up to approximately 50 $mV_{eff}$, and with the second straight half-line from approximately 800 $mV_{eff}$ up to $1/\sqrt{2}$ times the diode breakdown voltage $U_B$, for example up to 50 $V_{eff}$.

In view of the excellent linearity of the improved demodulator, the additional circuit components which are required, are minor in comparison: a current source, which can be established by a single transistor and one resistor, and a low-impedance drive for the demodulator, for example, by means of the complementary pair of emitter followers 11 and 12.

Obviously, the invention is not limited to push-pull type demodulators but can be used also for one-way drive demodulators as illustrated in FIG. 2. In this case, transformer 1 (of FIG. 1) is replaced by a choke coil 9 which serves only the purpose of closing the direct current circuit. The drive for the demodulator is accomplished by the complementary pair of emitter followers 11, 12 and condenser 10. This arrangement has the advantage of a simple design, e.g. there is no need for a transformer with a coupling factor equal to approximately 1, but has the disadvantage of a non-linear initial zone which is enlarged by a factor of 2.

Figure 3:
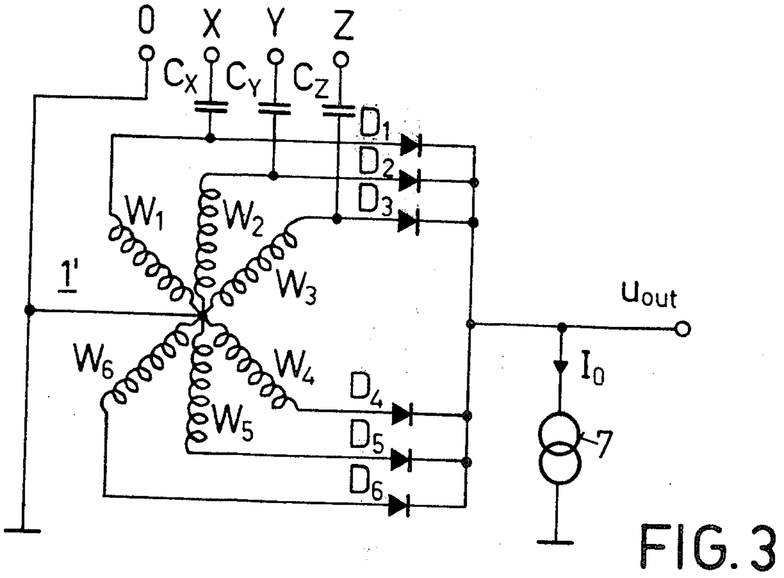
FIG. 3 is a circuit diagram of an AM-demodulator developed for multi-phase operation.

The AM-demodulator circuit arrangement illustrated in FIG. 3 represents a 3-phase application of the invention. Transformer 1' is seen to consist of six star-connected phase windings $W_1$ to $W_6$ and diodes $D_1$ to $D_6$ are associated respectively therewith. The drive for the demodulator is accomplished by way of input terminals X, Y and Z connected respectively through coupling capacitors $C_X$, $C_Y$, $C_Z$ to the outer "free" ends of phase windings $W_1$, $W_2$ and $W_3$ and terminal 0 is connected to the grounded star point of the inner ends of all windings $W_1$ to $W_6$. Diodes $D_1$ to $D_3$ have their anodes connected to the outer ends of windings $W_1$ to $W_3$ respectively, and diodes $D_4$ to $D_6$ have their anodes connected to the outer ends of phase winding $W_4$ to $W_6$, respectively. The cathode sides of all of the diodes are interconnected to one another and to the demodulator output terminal $u_{out}$. A current source 7 of the same type as utilized in the embodiment of FIG. 1 is connected between ground, i.e. the star connection point of transformer 1' and the demodulator output.

The invention affords two possibilities for avoiding a voltage shift $u_s$ in the case of the embodiments depicted in FIGS. 1 to 3 and which are disclosed below, utilizing the push-pull demodulator of FIG. 1 as an example. The first possibility is to connect the center tap 2 of transformer 1 with the ground — not directly — but rather through a diode 13, the pass-through direction of which is from the center tap to ground. This diode should be identical in type with the diode components of the demodulator, e.g. 5, 6. The potential of the center tap 2 is raised to the potential of the voltage shift $u_s$ by means of a second current source 14 e.g. of the same type as source 7. A capacitor 15, connected in parallel with diode 13, serves to short-circuit the latter so far as any alternating voltage is concerned.

Figure 4:
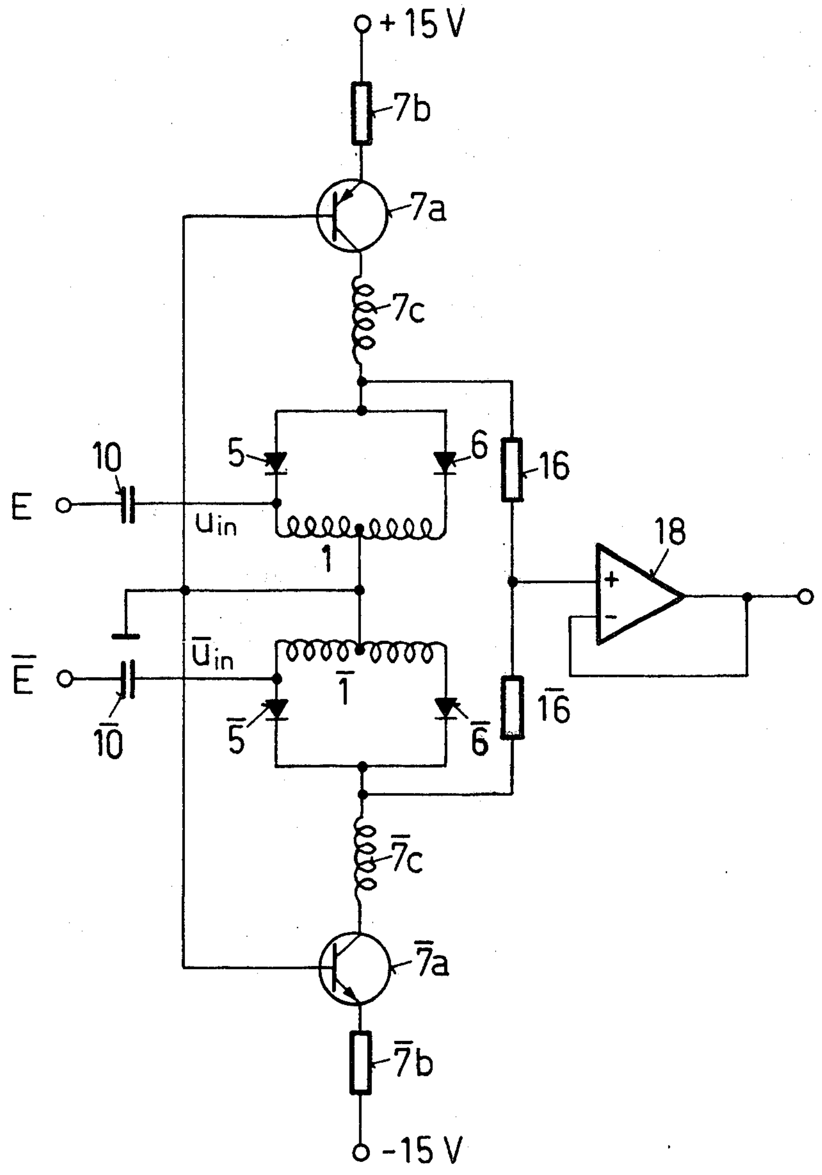
FIG. 4 shows a circuit diagram for still another embodiment of the invention which utilizes dual demodulator circuits.

A second, and by far the more advantageous, possibility for elimination of the voltage shift is the use of an additional demodulator which is designed complementary to, and which is coordinated with the first demodulator, an arrangement which is depicted in FIG. 4. Here the two AM-demodulators are seen to be identical except for the diode polarity and current source, with the components of the first demodulator circuit being distinguished from corresponding components of the second demodulator circuit by the use of symbol ($\overline{\ }$) in conjunction with the various reference numerals assigned to them.

The two outputs at the interconnected anode sides of the diode pair $\overline{5}, \overline{6}$ and at the interconnected cathode side of diode pair 5, 6 are interconnected by means of summing components 16, $\overline{16}$, with a voltage follower 18 added, if desired. The current sources 7 and $\overline{7}$ shown in FIG. 4 differ from those shown in FIG. 1, these being formed by transistors *7a*, $\overline{7a}$ and emitter resistors *7b*, $\overline{7b}$, with the transistors coupled through chokes *7c* and $\overline{7c}$.

When an amplitude-modulated alternating voltage is fed into one of the inputs E, the other remaining load free, (it is even possible to omit transformer $\overline{1}$ and condenser $\overline{10}$ and to connect the anode side of the diodes to ground), the arrangement will function like a simple AM-demodulator but without any voltage shift. This complementary arrangement will furthermore improve the temperature stabilization. If inputs E and $\overline{E}$ are connected, the summation point will remain at the same potential (in the case of FIG. 4 at ground potential), even if AM signals are fed into the two inputs which are connected with each other.

Obviously, the circuit arrangement depicted in FIG. 4 can be utilized also for demodulation of frequency-modulated signals if a frequency discriminating network, which converts changes in frequency into changes in amplitude, is connected in front of the demodulator of FIG. 4. The specific arrangement is part of the current state of the art, as to which reference is made to the forementioned "Taschenbuch der Hochfrequenztechnik", chapter 61 and following, pp 1383 and following.

The various circuit arrangements as disclosed makes it possible to provide demodulators for amplitude-modulated signals (and also for frequency-modulated signals if appropriate frequency-amplitude converter networks are interposed) which are distinguished by excellent linearity at great band width. Due to the absence of an integrator at the output, a standard component in the case of known demodulators, and due to the constancy of the sum of the instantaneous values of the diode currents, the output impedance will not be influenced by frequencies and signal amplitudes. The frequency range of the demodulator is controlled primarily by the transformer being used, but not by the diodes, and extends, with the transformer from 50 kHz to 20 MHz and above, at limited signal amplitude, and from 500 kHz to 10 MHz and above, with signal amplitudes which are restricted only by the magnitude of the supply voltages.

I claim:

1. A demodulation circuit for amplitude-modulated electrical signals which includes at least two diodes having a pair of like poles thereof interconnected with each other, a current source connected to said diodes for biasing said diodes in their forward conducting direction such that the sum of the diode currents remains constant, and means connecting the other pair of like poles of said diodes to an input signal source whose impedance is low in relation to the differential resistance of one of said diodes at the forward biasing current provided by said current source.

2. A demodulation circuit as defined in claim 1 wherein said current source for biasing said diodes is connected between a junction point of the interconnection between said diodes and a reference potential.

3. A demodulation circuit as defined in claim 1 wherein the demodulator has a one-way drive, and wherein said diodes are connected with each other by way of a choke coil, one end of said choke coil being connected to the high terminal of the input signal source and the other end being connected to the low terminal of the input signal source.

4. A demodulation circuit as defined in claim 1 wherein the demodulator has a push-pull drive, and wherein the diodes are connected with the opposite ends of a transformer winding, the input signal source being connected to one of the ends of said transformer winding, and said transformer winding being provided with a center tap connected to a source of reference potential which constitutes the push-pull drive.

5. A demodulation circuit as defined in claim 4 wherein the center tap on said transformer winding is connected to a reference potential established by an additional current source and a diode and by-pass capacitor connected in parallel therewith.

6. A demodulation circuit as defined in claim 1 and which is structured to be driven from a multi-phase input signal source, said circuit including a multi-phased transformer to the phase windings of which said source is connected, concordantly poled diodes being assigned to each phase winding and wherein all of the diodes are biased in the forward direction such that the sum of the diode currents remains constant.

7. A demodulation circuit as defined in claim 6 wherein all of the transformer windings are connected to a common star point which is connected to a source of reference potential by way of a diode which is connected to an additional current source.

8. A twin demodulation circuit consisting of a first and a second demodulation circuit each as defined in claim 1 and wherein the second demodulator circuit which is complementary to the first one is provided for operation conjointly therewith, the outputs of both demodulators being interconnected with each other by way of a summing circuit, and the input signal source being connected to at least one of the demodulators.

9. A demodulation circuit as defined in claim 8 wherein the input signal source is connected to both demodulators.

10. A twin demodulation circuit as defined in claim 8 and which further includes an amplifier stage with high input impedance connected with the output of the twin demodulation circuit.

11. A demodulation circuit as defined in claim 1 and which further includes an amplifier stage with high input impedance connected with the output of the demodulation circuit.

* * * * *